June 29, 1965    R. L. BURTNER    3,192,522
APPARATUS FOR THE AUTOMATIC NAVIGATION AND GUIDANCE
OF AN AIRCRAFT OR THE LIKE
Filed Sept. 18, 1951    2 Sheets-Sheet 1
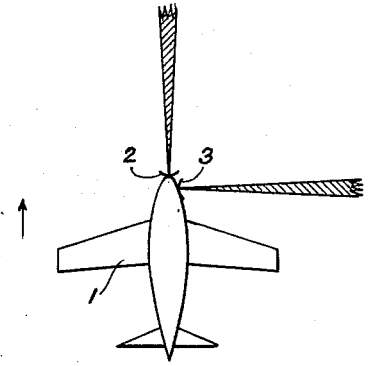
Fig. 1
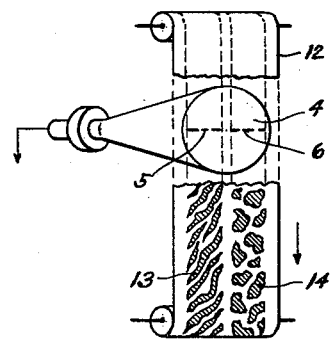
Fig. 2
Fig. 4
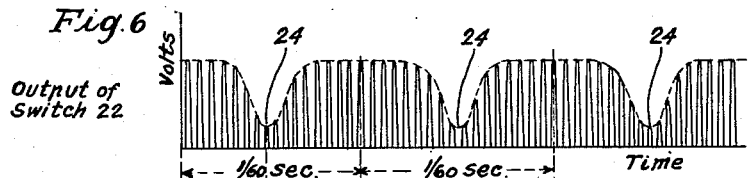
Fig. 5
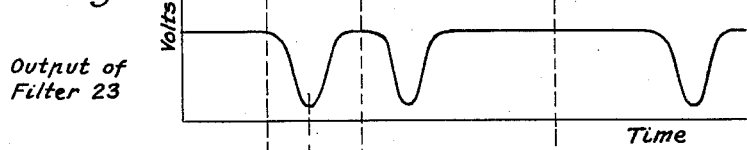
Fig. 6
Output of Switch 22
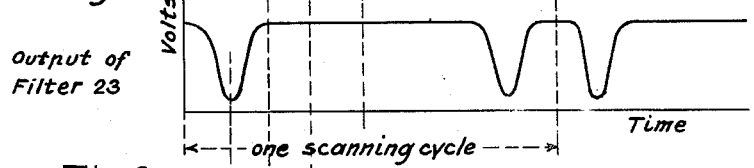
Time
Fig. 7
Output of Filter 23
Time
Fig. 8
Output of Filter 23
Time
Fig. 9
INVENTOR.
Richard Lee Burtner
BY
ATTORNEY

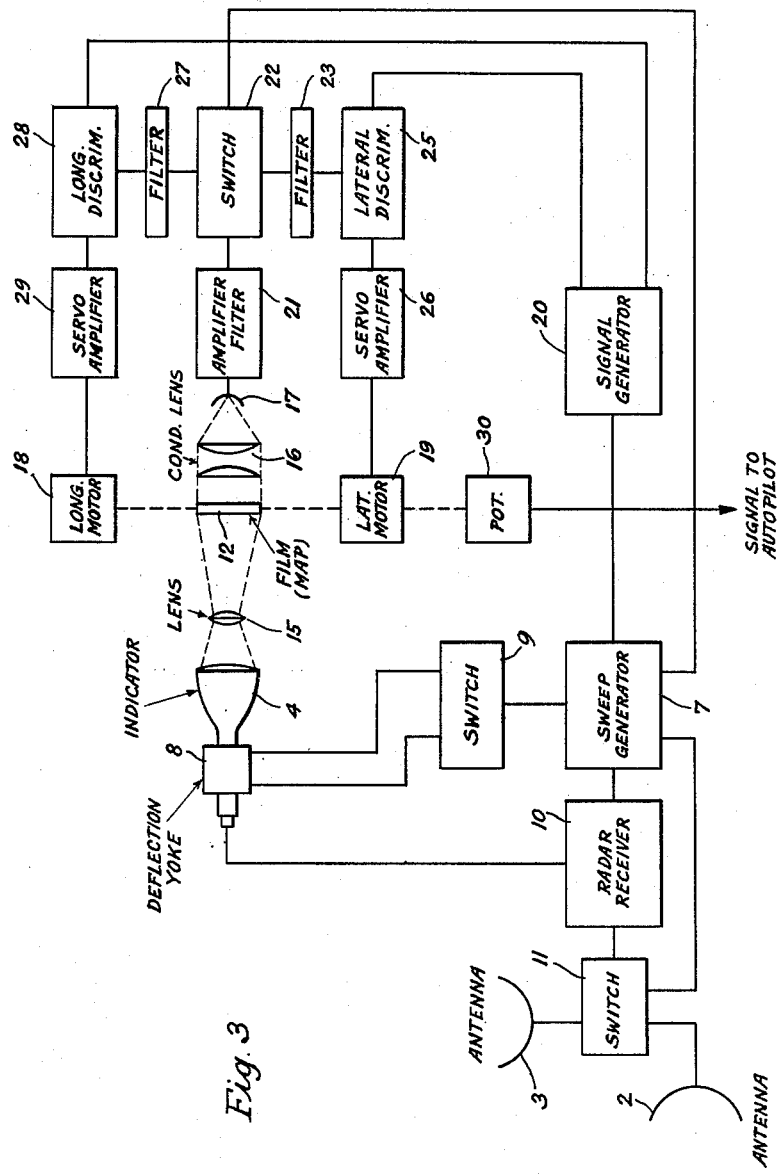

United States Patent Office

3,192,522
Patented June 29, 1965

3,192,522
APPARATUS FOR THE AUTOMATIC NAVIGATION AND GUIDANCE OF AN AIRCRAFT OR THE LIKE
Richard Lee Burtner, Canton, Ohio, assignor to Goodyear Aerospace Corporation, a corporation of Delaware
Filed Sept. 18, 1951, Ser. No. 247,077
8 Claims. (Cl. 343—7)

This invention is concerned with a system for automatic terrain recognition and navigation of aircraft, and, more particularly, is concerned with electronic apparatus for maintaining a match between a previously prepared strip map of the terrain over which the aircraft is flying with information obtained from laterally and longitudinally beamed radar antennas carried by the aircraft.

It has been proposed heretofore in the patent application of Meneley and Langworthy, Serial No. 66,048, filed December 18, 1948, to provide guidance for a pilotless aircraft or the like by the automatic comparison of a radar display image of the terrain over which the aircraft is flying with stored reference information in the form of an opposite contrast reference map having substantially the same scale and orientation as the radar image. While the apparatus described in the above-identified application is effective in guiding an aircraft over a predetermined course, the apparatus is subject to certain limitations which are objectionable, particularly under certain circumstances. First, the radar display image covers a large area of terrain extending in approximately a 120° sector laterally and extending from a point directly beneath the aircraft to the horizon ahead of the aircraft. Because of the large area of the terrain taken in, it is difficult to photograph a continuous strip of the terrain. Therefore, practice has been to make the reference map in the form of a group of independent maps which are successively snapped into position as the aircraft advances along its course. Secondly, to get adequate definition in the radar display image, the radar beam must be relatively narrow, of the order of one degree, in the plane in which the beam is scanned. This relatively narrow radar beam is scanned through the 120° sector repeatedly to produce a substantially instantaneous image of the terrain. However, as the speed of the aircraft increases, a limitation is reached where the airplane advances such a distance during one scan that there is a significant shift in the position of the aircraft relative to the terrain between successive scans so as to cause the matching apparatus to lose control. Thus, the prior art practice involves rather complicated apparatus for successively snapping in individual reference map transparencies, and is limited to aircraft velocity of approximately 1,000 miles per hour.

It is the general object of this invention to avoid and overcome these and other limitations and objections to the prior art practices by the provision of an improved and sensitive apparatus for automatically guiding pilotless aircraft or the like in flight and capable of maintaining control at supersonic speeds.

Another object of this invention is the provision of a navigational control apparatus in which fixed radar beams are utilized to produce line or slit images of the terrain along a relatively narrow path longitudinally and laterally of the aircraft.

Another object of this invention is to provide means for automatically maintaining a match between the longitudinal and lateral line or slit images and a composite previously prepared strip map of the terrain over which the course of the aircraft passes.

These and other objects of the invention which will become apparent as the description proceeds are achieved by providing apparatus for automatically guiding an aircraft or the like including a previously prepared strip radar map which is in the form of a continuous negative transparency and which is divided into two longitudinal sections, one section corresponding to longitudinal information and the other section corresponding to lateral information relative to the path of the aircraft of the terrain over which the desired course of the aircraft passes. A longitudinal motor means associated with the strip map continuously moves the strip longitudinally and lateral motor means associated with the map adjusts the strip laterally. Radar means alternately produces a visual line image of the terrain longitudinally ahead of the path of the aircraft and laterally of the aircraft. The visual line images are focused on the respective sections of the strip map. Electronic means coupled with the radar means effects a scanning movement of the line images laterally relative to the map at a periodic rate of movement. Light sensitive means in back of the strip map measures the variation in light from the line images transmitted by the map and generates a voltage output signal responsive to the variations in light as the line images scan back and forth relative to the map. Longitudinal error-discriminating means responsive to the phase relationship of the change in light level as the longitudinal line image passes through a match with the map image relative to the scanning movement and lateral error discriminator means responsive to the phase relationship of the change in light level as the lateral line image passes through a match with the map image relative to the scanning movement are alternately coupled to the output of the light sensitive means by switching means which is synchronized with the radar means. Separate motor control means associated with the longitudinal drive motor and responsive to the output error signal of the longitudinal discriminator, and motor control means associated with the lateral adjusting motor and responsive to the output error signal of the lateral discriminator, are provided to control the motors for adjusting the position of the map to maintain a continuous alignment between the map and the average position of the line images. Means responsive to the lateral position of the map relative to the aircraft produces a signal which is applied to a conventional autopilot system for controlling and adjusting the flight of the aircraft to maintain it on course.

For a better understanding of the invention, reference should be had to the accompanying drawings, wherein:

FIG. 1 is a plan view of the aircraft showing the approximate positions of the radar beams;

FIG. 2 is a diagrammatic representation of the radar scope and film strip showing the relative position of the slit images on the scope and the longitudinal and lateral information portions of the film strip;

FIG. 3 is a block diagram of one typical embodiment of the apparatus;

FIG. 4 shows a typical instantaneous line image as it appears on the radar scope;

FIG. 5 shows the corresponding negative image as it appears on the film strip;

FIG. 6 is a graphical representation of the voltage signal at the input of the filter and discriminator circuits with alignment between the radar image and the strip map image as in FIGS. 4 and 5;

FIGURES 7 and 8 are graphical representations of the input signal to the discriminator when there is a displacement error either to the right or left between the images of FIGURES 4 and 5; and FIG. 9 is a graphical representation of the D.C. output signal of the discriminator with a shift in the relative alignment of the radar image and map image.

With specific reference to the form of the invention illustrated in the drawing, the numeral 1 indicates generally an aircraft or the like upon which are mounted two radar antennas 2 and 3 capable of transmitting narrow radar beams at right angles to each other, the antenna 2 directing a beam longitudinally ahead of the aircraft 1 and the antenna 3 directing a radar beam laterally of the aircraft 1, as indicated in FIG. 1. These beams are preferably fixed in position with respect to the earth by means of gyroscopic and compass stabilization of the antennas so as not to be affected by small changes in altitude and heading of the aircraft. While the beams are relatively narrow in the horizontal plane, in the vertical plane they extend in a sector, the radar beams intercepting the earth along a line extending from directly beneath the airplane to the horizon directly in front of the aircraft and at right angles thereto in a lateral direction.

Radar means is provided in the aircraft for producing visual images of the information derived from the reflection of the radar beams by the terrain below. The radar means includes a scope 4 on which information obtained by the reflection of the radar beams produced by the antennas 2 and 3 is reproduced in the form of visual line images 5 and 6 respectively. It is to be understood that in calling for a line image as referred to, the claims contemplate an image of finite width, but of substantially greater length than width.

A sweep generator 7 in combination with a deflection yoke 8 alternately generates the lines 5 and 6 on the face of the scope 4. A switch 9, synchronized by the sweep generator 7, reverses the polarity of the sweep so that the two lines 5 and 6 are scanned horizontally in opposite directions from the center of the scope. The brightness of the lines 5 and 6 along their lengths is modulated by information from the radar receiver 10, which is alternately connected to the antennas 2 and 3 by means of a switch 11. In a manner peculiar to the radar technique and well known to those familiar with the art, the instantaneous light intensity along the image 5 and 6 will vary in intensity along their lengths as a function of the reflective qualities of the terrain intercepted by the radar beams and the distance of these terrain features from the aircraft. Thus, considering the effect of the lateral antenna 3 and the reproduced visual line image 6, as the radar beam sweeps across the terrain with movement of the aircraft, the light and dark spots making up the line 6 will be continually shifting and changing in intensity as a result of variations in the terrain. An unexposed film strip, for example, when moved across the front of the scope 4 and exposed by the line 6, reproduces varying details of the terrain in the form of light and dark areas, as particularly shown in FIG. 2, the line image being in effect a slit on which the image is focused for exposing the film strip. If the film strip is moved across the scope at a speed corresponding to the ground speed of the aircraft, these light and dark areas will take on the same shape and size, to scale, as the physical details of the terrain passed over.

The line image 5 is similarly modulated by information received by the antenna 2, and if a film strip is moved across at right angles to the line 5, the film is exposed continuously in correspondence to variations in the intensity and relation of the light and dark areas along the line 5. The resulting dark and light areas of the film do not appear as actual physical details of the terrain, but appear as more or less diagonally extending areas which are the result of particular terrain configurations moving toward and beneath the aircraft in the path of the longitudinal radar beam. The film strip is indicated at 12 in FIG. 2, and when exposed includes two longitudinally extending sections 13 and 14 corresponding to longitudinal and lateral information respectively.

This film strip is usually prepared in a manner as described above, the aircraft being flown over the intended course prior to the controlled flight. Radar-generated line images 5 and 6 serve in effect as split images which are focused on the film and continuously expose the film as it is passed over the slit images. Although the reference map strip 12 is preferably made from actual radar photographs obtained by flying a similar radar installation over the area before the controlled aircraft flight, other methods for producing such a map and simulating actual radar photographs may be employed, such as the utilization of an ultrasonic radar trainer operating over a built-up model of the terrain over which the aircraft is to fly.

The particular map strip 12, indicative of the terrain over which the course of the aircraft is to pass, having been obtained, actual navigation or controlled flight of the aircraft is derived therefrom in the following manner. See FIG. 3. The film strip 12 is carried by any suitable frame means (not shown) in front of the indicator scope 4. A lens 15 focuses the line images of the scope 4 onto the surface of the film strip 12. Condensing lens 16 focuses the transmitted light onto a photocell or other light sensitive means indicated at 17.

A longitudinal drive motor 18 is coupled to the film strip 12 by any suitable gearing means and functions to move the film strip longitudinally across the path of the projected line images 5 and 6. A lateral adjusting motor 19 shifts the film strip laterally by way of appropriate gearing means (not shown). The longitudinal motor 18 and lateral motor 19 are actuated by means hereinafter described to maintain a substantial alignment or match between the line images on the scope 4 and the information on the strip map 12.

While operation of either motor cannot be completely divorced from the control of the other because movement of one motor affects control of the other, nevertheless, for the sake of clarity, control of the lateral motor 19 by means of information received through the antenna 3 will be first considered in detail. As mentioned above, the antenna 3, by means of radar receiver 10 and sweep generator 7, produces a substantially instantaneous line image 6 which at any particular instant might appear when enlarged as a series of light and dark areas much as shown in FIG. 4. Assuming the film strip is properly positioned longitudinally, the corresponding section of the lateral information portion 14 appears as in FIG. 5. The film strip being in the form of a negative transparency, and the line image being, in effect, a positive transparency, assuming that there is no lateral displacement error between the line image and the film strip, light areas of the line image 6 fall on the dark or opaque areas of the film strip so that the light falling on the photocell 17 is at a minimum. Displacement of the line image laterally either way in relation to the film strip results in an increased level of light falling on the photocell 17 as the result of the overlapping of the light areas of the line image with transparent areas of the map.

In order to detect if the line image 6 is relatively displaced to the right or to the left in relation to the map, the line image is periodically scanned laterally back and forth across the map. This is accomplished by means of a signal generator 20 which is coupled to the sweep generator 7. The signal generator 20 superimposes an alternating voltage signal on the sweep signal of preferably 30 cycles per second. This applies a periodic scanning motion to the line images 5 and 6. The scanning movement is at a much lower rate than the sweep frequency produced by the sweep generator 7 which is of the order of 600 sweeps per second for each of the line images 5 and 6.

The output signal of the photocell 17 is fed to an amplifier filter circuit 21 which amplifies and averages the photocell signal over a time interval corresponding to one sweep cycle of the sweep generator 7. Thus, the output of the amplifier filter 21 is a series of pulses having an amplitude proportional to the average light falling on the photocell from the line images. Because these pulses are produced by the alternate sweep of the line images 5 and 6, a switch 22, synchronized with switch 9 and 11 by means of generator 7, switches successive pulses to opposite output circuits to separate the longitudinal information from the lateral information, the switch 22 connecting the lateral information pulses to a filter circuit 23. The amplitude of the pulses varies with the scanning movement of the line image 6 at the 30 cycle per second rate initiated by the signal generator 20. During this scanning movement, the line image and the map pass through a point of match, at which time the level of light falling on the phototube 17 drops. These match points are indicated by the dips 24 in the envelope of the pulses as shown in FIG. 6. The envelope is reproduced from the pulses by the filter circuit 23. Depending upon the lateral displacement of the map 12 with the average position of the line image 6, the point at which match occurs is shifted in phase relative to the cyclic scanning movement. FIG. 6 illustrates the position of substantial alignment between the map and the line image, i.e., where the match occurs at the mid-point of the scan. The match points, as indicated by the dip 24, are equally spaced in time. A lateral shift to the right or left results in a match occurring at a point in the scan other than the mid-point. Such condition results in the signals graphically shown in FIGURES 7 and 8.

The error voltage for controlling the lateral motor to effect exact alignment between the map and radar line image is produced by a lateral discriminator circuit 25. A discriminator circuit 25 is preferably of a type described in the co-pending application S.N. 76,152, filed February 12, 1949. The output of the lateral discriminator is a D.C. voltage, the polarity and amplitude of which is a function of the relative phasing of the match point 24 during the scanning cycle. Thus, when the input to the discriminator is that of the envelope curve of FIG. 6, the output signal is zero. If the input signal to the discriminator is that of the curve of FIG. 7, a positive D.C. error voltage is generated. If the input signal to the discriminator is that of the curve of FIG. 8 a negative D.C. error voltage is generated. FIG. 9 shows the change in D.C. output voltage of the discriminator circuit with the change of phasing of the match point. This D.C. signal in turn, either zero, or positive or negative is applied to a servo amplifier 26 which controls the lateral motor 19 to either effect no movement with zero signal or to laterally shift the map 12 to right or to left and reduce the D.C. output signal of the discriminator to zero.

To maintain alignment between the longitudinal information portion 13 of the map 12 and the longitudinal line image 5, a similar filter 27, discriminator circuit 28, and servo amplifier 29 are provided for controlling the longitudinal drive motor 18. The longitudinal motor 18 is adjusted in the same manner as the lateral motor 19. Actually, as mentioned above, the adjustment of the two motors must take place substantially simultaneously because movement of the map by one motor affects the balance of the other. Thus, lateral movement will produce longitudinal error, and longitudinal movement may produce lateral error. However, this is not serious, since both lateral and longitudinal errors reach zero at the same time.

An error potentiometer 30, coupled to the lateral motor by appropriate gearing (not shown), provides right and left error information which is supplied to an autopilot for correcting and maintaining the aircraft on course or for indicating by suitable instruments the error in position of the aircraft relative to the intended course.

It will be recognized from the above description that the various objects of the invention have been achieved by the provision of an apparatus which automatically and continuously matches the position of the aircraft with the terrain over which the aircraft is flying and compares the actual position with the intended course of the aircraft to guide and maintain the aircraft on course. The invention is of particular application in the control of guided missiles, but is equally useful in navigating aircraft automatically under conditions which make it difficult to fly except by instruments. By the use of two fixed radar beams at right angles to each other, information is derived to automatically locate the aircraft on a previously prepared radar strip may without incorporating any scanning movement of the radar beams. The fixed radar beams make it possible to produce slit images of the instantaneous radar information, the slit images make it easy to photographically prepare and reproduce continuous strip photographs of the terrain over which the controlled course of the aircraft is to pass. The apparatus of the invention is relatively simple, yet accurate and sensitive, capable of operating at very high ground speeds, and capable of operating in fog, darkness, and under other adverse conditions.

While certain representative embodiments and details have been shown for the purpose of illustrating the invention, it will be apparent to those skilled in this art that various changes and modifications may be made therein without departing from the spirit or scope of the invention.

I claim:

1. Apparatus for the automatic navigation and guidance of aircraft including radar means transmitting a relatively fixed radar beam laterally of the aircraft, radar means transmitting a relatively fixed radar beam longitudinally ahead of the aircraft, indicator means for producing positive line images in response to said radar means, first switching means for alternately connecting said indicator means to each of said radar means, means synchronized with said switching means for deflecting the image on the indicator means whereby two line images relatively displaced are produced on the indicator means, each image corresponding to the information generated by one of the radar means, a previously prepared continuous strip map, said map being divided into two laterally arranged negatively transparent sections corresponding to lateral and longitudinal radar maps of the terrain over which the course of the aircraft is desired to pass, means for imparting periodic back-and-forth scanning movement to said line images laterally relative to the strip map, motor means for driving the strip map longitudinally, motor means for adjusting the strip map laterally, means for focusing said line images onto the respective sections of the strip map, light sensitive means on the opposite side of the strip map responsive to the light transmitted through the map from the indicator means, amplifier means for amplifying the output signal of said light sensitive means, a discriminator means associated with each of the motor means, and second switching means alternately connecting separate said discriminator means to the output of said light sensitive means, said switching means being actuated synchronously with each first switching means, said discriminator means being responsive to the relative phasing of the match point between the strip map and the line images for operating its associated motor means to adjust the map to reduce and hold the mismatch to zero.

2. Apparatus for the automatic navigation and guidance of aircraft including a previously prepared radar map, said map being in the form of a continuous negative transparency and being divided into two sections, one section corresponding to longitudinal information and one section corresponding to lateral information of the terrain over which the desired course of the aircraft passes, longitudinal motor means associated with the map for moving the strip longitudinally, lateral motor means associated with the map for adjusting the strip laterally, radar means for alternately producing a visual line image of opposite contrast to the map of the terrain longitudinally ahead of the path of the aircraft and laterally of the aircraft, means for focusing the longitudinal image on the longitudinal information section of the map and for focusing the lateral image on the lateral information section of the map, means for scanning said line images laterally relative to the map with a periodic motion, light sensitive means responsive to light from the line images transmitted by the map for detecting variations in light as the line images scan back and forth relative to the map, longitudinal error discriminator means responsive to the phase relationship of the dip in light level as the longitudinal line image passes through a match with the map image relative to the scanning movement, lateral error discriminator means responsive to the phase relationship of the dip in light level as the lateral line image passes through a match with the map image relative to the scanning movement, switching means synchronized with the alternately operated radar means for alternately switching the output of said light sensitive means to the longitudinal error discriminator means and the lateral error discriminator means, servo amplifier means associated with each of the longitudinal and lateral motor means and responsive to the output error signal of the longitudinal and lateral error discriminator means respectively, said motor means being controlled to position the map to align the map and radar line images and reduce the error signals to zero, and means responsive to the lateral position of the map relative to the aircraft for controlling the flight of the aircraft to maintain it on course.

3. Apparatus for the automatic navigation and guidance of aircraft including radar means transmitting a relatively fixed radar beam laterally of the aircraft, radar means transmitting a relatively fixed radar beam longitudinally ahead of the aircraft, indicator means for producing visual line images in response to said radar means, first switching means for alternately connecting said indicator means to each of said radar means, whereby two line images relatively displaced are produced on the indicator means, each image corresponding to the information generated by one of the radar means, a previously prepared continuous strip map of opposite contrast to the line images, said map being divided into two sections corresponding to lateral and longitudinal radar maps of the terrain over which the course of the aircraft is desired to pass, means for imparting periodic back-and-forth scanning movement to said line images laterally relative to the strip map, motor means for driving the strip map longitudinally, motor means for adjusting the strip map laterally, light sensitive means on the opposite side of the strip map responsive to the light transmitted through the map from the indicator means, a discriminator means associated with each of the motor means, and second switching means alternately connecting a separate discriminator means to the output of said light sensitive means, said switching means being actuated synchronously with said first switching means, each discriminator means being responsive to the relative phasing of the match point between the strip map and the line images for adjusting the map to reduce and hold the mismatch to zero.

4. Apparatus for the automatic navigation and guidance of aircraft including radar means transmitting a relatively fixed radar beam laterally of the aircraft, radar means transmitting a relatively fixed radar beam longitudinally ahead of the aircraft, indicator means for producing visual line images in response to said radar means, whereby two line images relatively displaced are produced on the indicator means, each image corresponding to the information generated by one of the radar means, a previously prepared continuous strip map of opposite contrast to the line images, said map being divided into two sections corresponding to lateral and longitudinal radar maps of the terrain over which the course of the aircraft is desired to pass, means for imparting periodic back-and-forth scanning movement to said line images laterally relative to the strip map, motor means for driving the strip map longitudinally, motor means for adjusting the strip map laterally, light sensitive means on the opposite side of the strip map responsive to the light transmitted through the map from the indicator means, a discriminator means associated with each of the motor means, and switching means alternately connecting the separate discriminator means to the output of said light sensitive means, said discriminator means being responsive to the relative phasing of the match point between the strip map and line images for adjusting the map to reduce and hold the mismatch to zero.

5. Apparatus for the automatic navigation and guidance of aircraft including a previously prepared strip radar map, said map being in the form of a continuous negative transparency and being divided into two sections, one section corresponding to longitudinal information and one section corresponding to lateral information relative to the terrain over which the desired course of the aircraft passes, longitudinal motor means associated with the map for moving the strip longitudinally, lateral motor means associated with the map for adjusting the strip laterally, radar means producing visual line images of the terrain longitudinally ahead of the path of the aircraft and of opposite contrast to the map and laterally of the aircraft, means for focusing the longitudinal line image on the longitudinal information section of the map and for focusing the lateral line image on the lateral information section of the map, means for scanning said line images relative to the map with a periodic motion, light sensitive means responsive to light from the line images transmitted by the map for detecting variations in light as the line images scan back and forth relative to the map, longitudinal error discriminator means responsive to the phase relationship of the dip in light level as the longitudinal line image passes through a match with the map image relative to the scanning movement, lateral error discriminator means responsive to the phase relationship of the dip in light level as the lateral line image passes through a match with the map image relative to the scanning movement, servo amplifier means associated with each of the longitudinal and lateral motor means and responsive to the output error signal of the longitudinal and lateral error discriminator means respectively, said motor means being controlled to position the map to align the map and radar line images and reduce the error signals to zero, and means responsive to the movement of the lateral motor means for controlling the lateral movement of the aircraft to maintain it on course.

6. Apparatus for the automatic navigation and guidance of aircraft including a previously prepared radar map, said map being in the form of a continuous negative transparency and being divided into two laterally arranged sections, one section corresponding to longitudinal information and one section corresponding to lateral information relative to aircraft of the terrain over which the desired course of the aircraft passes, longitudinal motor means associated with the map for moving it longitudinally, lateral motor means associated with the map for adjusting it laterally, radar means producing visual line images of the terrain longitudinally ahead of the path of the aircraft and laterally of the aircraft, said line images being of opposite contrast to but to substantially the same scale and orientation as the map, means for focusing the longitudinal line image on the longitudinal information section of the map and for focusing the lateral line image on the lateral information section of the map, means for scanning said line images laterally relative to the map with a periodic motion, light sensitive means responsive to light from the line images transmitted by the map for detecting variations in light as the line images scan back and forth relative to the map, longitudinal error discriminator means responsive to the phase relationship of the dip in light level as the longitudinal line image passes through a match with the map image relative to the scanning movement, lateral error discriminator means responsive to the phase relationship of the dip in light level as the lateral line image passes through a match with the map image relative to the scanning movement, and servo amplifier means associated with the motor means and responsive to the output error signals of the error discriminator means to position the map to align the map and radar line images and reduce the error signals to zero.

7. Apparatus for the automatic navigation and guidance of aircraft including a previously prepared radar map means, said map means being negatively transparent and having one section corresponding to longitudinal information and one section corresponding to lateral information of the terrain over which the desired course of the aircraft passes, longitudinal motor means associated with the map means for moving it longitudinally, lateral motor means associated with the map means for adjusting it laterally, radar means producing substantially instantaneous positive line images of the terrain longitudinally ahead of the path of the aircraft and laterally of the aircraft, means for scanning said line images laterally relative to the map means with a periodic motion, light sensitive means responsive to light from the line images transmitted through the map means for detecting variations in light as the line images scan back and forth relative to the map means, longitudinal error discriminator means for driving the longitudinal motor means and responsive to the phase relationship of the dip in light level as the longitudinal line image passes through a match with the map means relative to the scanning movement, lateral error discriminator means for driving the lateral motor means and responsive to the phase relationship of the dip in light level as the lateral line image passes through a match with the map means relative to the scanning movement.

8. Apparatus of the type described including a composite radar strip map having separate columns respectfully of longitudinal and lateral reference information of the terrain over which the aircraft is intended to fly, means for producing separate substantially instantaneous radar line images of the terrain along paths extending laterally and longitudinally ahead of the aircraft, means for superimposing a line image over its related column and to substantially the same scale and orientation, means for automatically effecting relative scanning motion between said images and the strip map, means automatically responsive to the relative alignment of the map and images for seeking and maintaining a match between the map and images, and control means responsive to the relative lateral position of the map for controlling the heading and flight path of the aircraft.

References Cited by the Examiner
UNITED STATES PATENTS

| | | | |
|---|---|---|---|
| 2,459,482 | 1/49 | Bond | 343—7 |
| 2,508,562 | 5/50 | Bonner | 343—5 |
| 2,526,682 | 10/50 | Mulberger et al. | 343—9 |
| 2,582,588 | 1/52 | Fennessy et al. | 244—77 |
| 2,586,743 | 2/52 | Thresher et al. | 343—5 |

CHESTER L. JUSTUS, *Primary Examiner*.

NORMAN H. EVANS, *Examiner*.